May 6, 1947. M. N. RAINIER 2,420,095
BED HOOK
Filed Jan. 13, 1945

INVENTOR.
Maurice N. Rainier
BY
Atty.

Patented May 6, 1947

2,420,095

UNITED STATES PATENT OFFICE 2,420,095

BED HOOK

Maurice N. Rainier, Los Angeles, Calif.

Application January 13, 1945, Serial No. 572,628

3 Claims. (Cl. 5—296)

This invention has to do with fastening devices and, in its more particular aspects, relates to fastening devices of the type known as "bed hooks," such as are employed for securing the sides or rails of a bed to the bed posts.

The conventional manner of securing a post and side of a bed together so that they may be readily disassembled comprises a plate, known as a bed hook, rigidly secured to the side member and projecting outwardly from the end thereof, the plate having hooks to engage a pair of spaced pins disposed transversely of a recess in the bed post. A long existing difficulty with such conventional bed hooks has been the fact that, unless the pins in the post recess are meticulously positioned and spaced with particular relation to each other and to the bed hook employed, a faulty joint is obtained with the result that when the bed is assembled there is too much lost motion in the joints and they sometimes become accidentally disassembled. Also, unless the pins securing the bed hook to the rail are carefully positioned it may be impossible to assemble the joint at all.

I have discovered that this long existing and rather serious shortcoming may be completely overcome by mounting the bed hooks on the side rail members in such manner that they may automatically adjust themselves to compensate for slight inaccuracies in the spacing and positioning of the receiving pins and by providing means for automatically tightening the joint after it is formed. Those form the chief objects of my invention.

In general, I accomplish those objects by providing in the hook member a pair of elongated slots, through which slots extend the pins which secure the hook to the side or rail member, the slot permitting the hook to move relative to the fixed pins in the rail and post to accomplish the necessary adjustment. In the most preferred adaptation of my invention I find it highly advantageous to provide somewhat arcuate or angular slots in the hook member so that in course of effecting the automatic adjustment the hook member first moves outwardly relative to the rail member and thence finally inwardly to tighten the joint.

I shall now describe one preferred embodiment of the invention, making reference to the accompanying drawings, in which.

Figure 1:
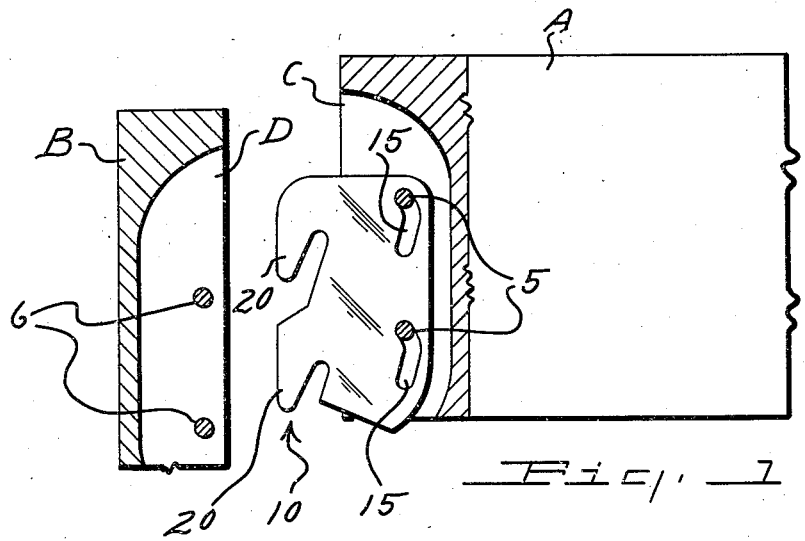
Fig. 1 is a side elevation, partly in section, showing the device in one position.

Referring now to the drawings I show at A and B two members to be secured together. Typically those members may be, respectively, the side or rail member of a bed and a bed post, of conventional construction—that is, the rail A has the usual end recess C and the post B has the usual side recess D. Transversely of the recess C I provide a pair of spaced pins 5 and transversely of the recess D there are two vertically spaced pins 6, the pins 5 and 6 being stationarily mounted.

Figure 2:
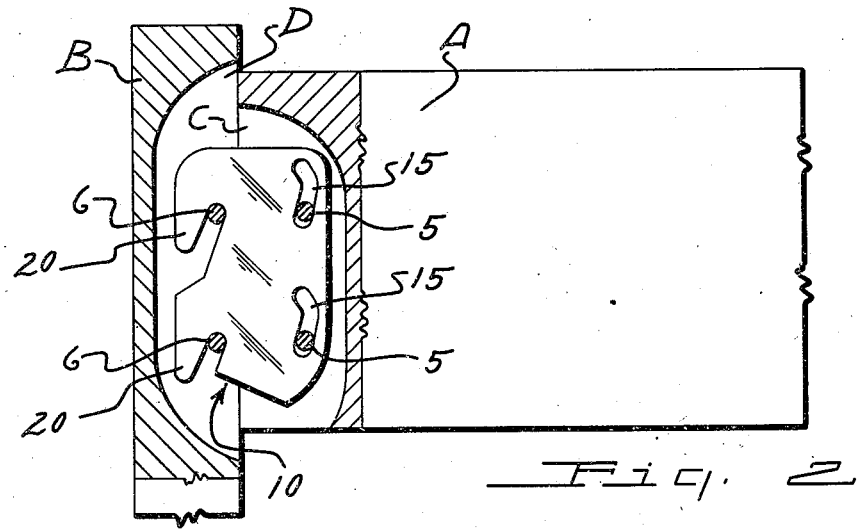
Fig. 2 is a view similar to Fig. 1 but showing the device in assembled condition.
Figure 3:
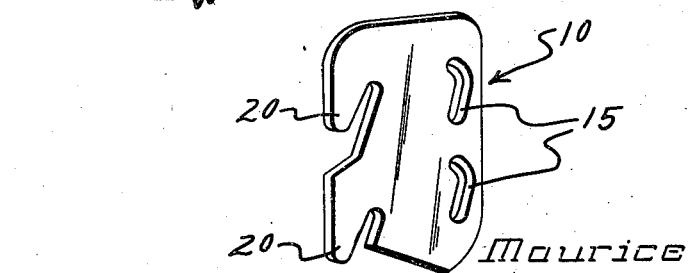
Fig. 3 is a perspective of the plate forming the hook member.

My improved bed hook member is generally denoted by the numeral 10 and consists of a flat plate having adjacent its inner or right-hand side edge a pair of slots 15 through which the pins 5 extend and along which the pins 5 may slide. Each of the slots 15 is preferably angular or somewhat inwardly curved, although the ideal shape of the slots is not a true curve from end to end. For instance, each of the slots 15 shown in the drawing consists of two legs disposed angularly to each other but the side walls of the slots at the point of their intersection are curved to facilitate smooth sliding movement of the plate relative to the pins 5. The shorter top end of each slot is disposed at an obtuse angle to the longer lower end of the slot to facilitate retaining the plate in the position of Fig. 1 during insertion of the hook member to be described into the slot in the post, as will be described. The opposite or outer edge of the plate presents a pair of hook portions 20 for engagement over the pins 6 when the members A and B are assembled (Fig. 2).

From the foregoing it will be observed that instead of the conventional rigid attachment of the hook member to the rail member, it is somewhat floatingly attached. Thus to assemble the members A and B, the hook member 10 is first moved relative to the pins 5 into the position shown in Fig. 1, with the pins 5 abutting the upper ends of the slots 15, which movement will normally automatically take place by virtue of gravity.

The hooks 20 are then inserted in the recess D at the upper portion thereof, in which position the hooks 20 will overhang the pins 6. During the insertion of the hooks into recess D any accidental relative movement as between the plate and rail A is opposed by virtue of the angular disposition of the short top ends of the slots 15— that is, the pins 5 abut the left-hand walls of the slots which in effect provide angular shoulders which tend to oppose movement of the pins downwardly in the slots. By then pushing downwardly on the rail A, the member 10 will be moved relative to the rail and pins 6 from the position of Fig. 1 to the position of Fig. 2. In the course of this movement, as the pins 5 ride over the side walls of the slots 15, which walls provide cam surface, the member 10 will first move outwardly of the recess C and thence inwardly to tighten the joint after the hooks 20 have engaged over the pins 6. Thus not only are the hooks so moved relative to the pins 6 that they may engage thereover despite inaccuracies in their positioning and spacing, but the final joint is an extremely tight one since any weight applied to the rail A tends to urge the side wall of the slots against the pin 5. When it is desired to separate the elements A and B, it is only necessary to lift the rail A which again will protract the member 10 outwardly of the recess C, thus facilitating disengagement of the hooks 20 from the pins 6.

I claim:

1. A joint structure comprising a post having a recess in its side, a pair of pins disposed transversely of the post and spaced apart longitudinally thereof, said pins extending across the recess, a rail adapted to be joined at its end to the post and having a recess in its end, a pair of lateral pins carried by the rail and spaced apart in a plane parallel with the post, said last-named pins extending across said last-named recess, and a plate having a pair of lengthwise elongated slots adjacent one of its side edges through which slots the respective last-named pins extend and along which said last-named pins are slidable, the opposite side edge of the plate presenting a pair of hook members engageable over the respective first-mentioned pins, said slots having a side wall portion providing angularly disposed cam surfaces engageable by the respective pins carried by the rail to cause movement of the plate relative to the post and rail in a direction longitudinally of the rail.

2. In a pair of structural members adapted to be joined together and each presenting a pair of stationary, laterally disposed pins, means for joining said members together, comprising a plate having a pair of elongated lengthwise slots through which the respective pins of one of the structural members extend and along which the last-named pins are slidable, and a pair of hook members carried by the plate for engagement over the respective pins presented by the other structural member, each of said slots having a side wall providing relatively angularly disposed cam surfaces engageable by said respective pins to cause movement of the plate relative to the structural members.

3. In a pair of structural members adapted to be joined together and each presenting a pair of stationary, laterally disposed pins, means for joining said members together, comprising a plate having a pair of elongated lengthwise slots through which the respective pins of one of the structural members extend and along which the last-named pins are slidable, and a pair of hook members carried by the plate for engagement over the respective pins presented by the other structural member, each of said slots being comprised of two adjoining portions disposed at an obtuse angle to each other, the top portion of each slot being shorter than the bottom portion.

MAURICE N. RAINIER.

REFERENCES CITED

The following references are of record in the file of this patent:

UNITED STATES PATENTS

| Number | Name | Date |
| --- | --- | --- |
| 2,246,090 | Filer | June 17, 1941 |
| 2,305,063 | Collins | Dec. 15, 1942 |
| 2,211,980 | Luppert | Aug. 20, 1940 |
| 2,169,138 | Causey | Aug. 8, 1939 |
| 2,242,537 | Moore | May 20, 1941 |
| 2,261,820 | Zimtbaum | Nov. 4, 1941 |